(12) United States Patent
Leach

(10) Patent No.: US 6,590,370 B1
(45) Date of Patent: Jul. 8, 2003

(54) SWITCHING DC-DC POWER CONVERTER AND BATTERY CHARGER FOR USE WITH DIRECT OXIDATION FUEL CELL POWER SOURCE

(75) Inventor: David H. Leach, Albany, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 0 days.

(21) Appl. No.: 10/261,823

(22) Filed: Oct. 1, 2002

(51) Int. Cl.[7] .............................. G05F 5/00; H01M 10/44
(52) U.S. Cl. ........................................ 323/299; 320/101
(58) Field of Search ................................. 320/101, 103, 320/125, 136; 323/299–303, 906; 363/16, 95, 97; 307/64, 66, 23; 429/30, 33, 41, 46; 324/433

(56) References Cited

U.S. PATENT DOCUMENTS

| | | | | |
|---|---|---|---|---|
| 4,455,619 A | | 6/1984 | Masui et al. ................. 345/530 |
| 4,673,624 A | | 6/1987 | Hockaday ..................... 429/41 |
| 4,810,597 A | | 3/1989 | Kumagai et al. .............. 429/22 |
| 5,285,862 A | * | 2/1994 | Furutani et al. ........... 180/65.4 |
| 5,323,102 A | * | 6/1994 | Torii et al. ..................... 322/90 |
| 5,382,893 A | * | 1/1995 | Dehnel ........................ 320/160 |
| 5,585,749 A | * | 12/1996 | Pace et al. ................... 327/108 |
| 5,659,206 A | * | 8/1997 | Taguchi et al. ............... 307/64 |
| 5,736,833 A | * | 4/1998 | Farris ......................... 320/163 |
| 5,744,984 A | * | 4/1998 | Drapac et al. ............... 324/433 |
| 5,759,712 A | | 6/1998 | Hockaday ..................... 429/30 |
| 5,811,958 A | * | 9/1998 | Yamamoto ................... 320/101 |
| 5,916,699 A | | 6/1999 | Thomas et al. ................ 429/3 |
| 6,322,917 B1 | | 11/2001 | Acker .......................... 429/17 |
| 6,433,522 B1 | * | 8/2002 | Siri ............................. 323/906 |
| 6,492,047 B1 | * | 12/2002 | Peled et al. ................... 429/30 |

* cited by examiner

Primary Examiner—Edward H. Tso
Assistant Examiner—Pia Tibbits
(74) Attorney, Agent, or Firm—Cesari and McKenna, LLP

(57) ABSTRACT

This invention presents a method and apparatus for controlling the operating point, i.e. the output voltage or current, of a fuel cell to a desired value, efficiently transferring the available fuel cell power to a rechargeable battery and load, and isolating the fuel cell from the battery and load. Active control of the operating point of the fuel cell allows for optimized power output and fuel cell efficiency. This invention uses feedback from the input to regulate the input voltage or current. The output of the DC-DC converter either charges the battery or helps the battery supply the load, and is maintained equal to the battery voltage as the output of the DC-DC converter is directly connected to the battery.

35 Claims, 3 Drawing Sheets

SWITCHING DC-DC POWER CONVERTER AND BATTERY CHARGER FOR USE WITH DIRECT OXIDATION FUEL CELL POWER SOURCE

BACKGROUND OF THE INVENTION

1. Field of the Invention

The present invention relates generally to battery charging and, more specifically, to a DC-DC converter and battery charger, which uses a direct oxidation fuel cell as a power source for charging a re-chargeable battery.

2. Background Information

There are numerous conventional techniques and components (e.g., off-the-shelf integrated circuits) for charging re-chargeable batteries such as lithium-ion batteries widely used in consumer electronic devices. Typically, an AC wall outlet or a 12 V DC source, commonly provided in automobiles, is used as a power source for this type of recharger.

One disadvantage of such conventional re-chargers is that they may not be particularly efficient, meaning that the re-chargers do not transfer a high percentage of power from the power source to the battery over a range of expected operating conditions. This is not surprising because high efficiency is not generally a criterion of excellence for such re-chargers. Rather, the ability to rapidly re-charge the battery and maintain or extend the battery's useful life is considered very important.

However, if a fuel cell, such as a direct oxidation fuel cell, is used as the power source, then the re-charger's efficiency becomes a much more important consideration. First, a fuel cell, which is part of a portable device, like a battery re-charger, has a finite amount of fuel available to it. In general, available fuel should be carefully managed to maximize user convenience, maximize the operating time of whatever device the fuel may power, and extend the time between re-fuelings. Thus, a highly efficient re-charger is desirable, if not essential, for realizing the substantial advantages of using a fuel cell as a power source for the re-charger.

SUMMARY OF THE INVENTION

In brief summary, the present invention provides a method and apparatus for actively controlling the operating point, i.e. the output voltage or current, of a direct oxidation fuel cell or fuel cell stack and enables efficient transfer of power from the fuel cell to a re-chargeable battery and load.

In accordance with one aspect of a preferred embodiment of the present invention, a DC-DC converter is coupled between a direct oxidation fuel cell and a parallel combination of a re-chargeable battery and load. In this arrangement, the output voltage of the fuel cell is supplied as the input voltage to the DC-DC converter. The output of the converter is preferably connected directly to the battery/load combination. As a result, the output voltage of the DC-DC converter equals the battery voltage, and the converter behaves as an unregulated current source whose output current either charges the battery or helps the battery supply current to the load.

The output voltage of the fuel cell is advantageously used as a closed loop feedback signal to control the duty cycle of the DC-DC converter switch elements. The feedback signal is compared with a reference that represents a predetermined, optimum output voltage for the fuel cell. Alternatively, it is possible to adjust the reference voltage to optimize the fuel cell output under different operating conditions. The closed loop operates to reduce to zero the difference between the feedback signal and reference. As a result, the fuel cell's output voltage is kept substantially constant over a wide range of battery voltages. In addition, while variations in the fuel cell's operating conditions (e.g., temperature, fuel flow rate and the like) will cause corresponding changes in the output current of the fuel cell, the fuel cell's output voltage is maintained generally constant by the device of the present invention.

Another advantage of the present invention is that by providing effective control over the operating voltage of a fuel cell stack, it is possible to maintain a safe minimum voltage which will prevent any cell in the stack from being reversed and possibly damaged due to a high load current and insufficient reactants in the cell. Similarly, effective control over the operating voltage enables different operating voltages to be established for different fuel concentrations, an important factor in attaining maximum efficiency from a direct methanol fuel cell.

In accordance with another aspect of a preferred embodiment of the present invention, a shunt voltage regulator is placed in parallel with the battery/load combination to protect the battery from an over-voltage condition.

In accordance with an alternative embodiment of the present invention, rather than using the fuel cell's output voltage as the feedback signal, the fuel cell's output current may be used. In such an arrangement, it is the fuel cell's output current, which is maintained essentially constant while the output voltage may vary.

Experiments have shown that using the present invention over a range of fuel cell output voltages, which are typical for direct methanol fuel cells, and a range of battery voltages typical for lithium-ion batteries, power efficiencies in excess of 90% are achievable.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
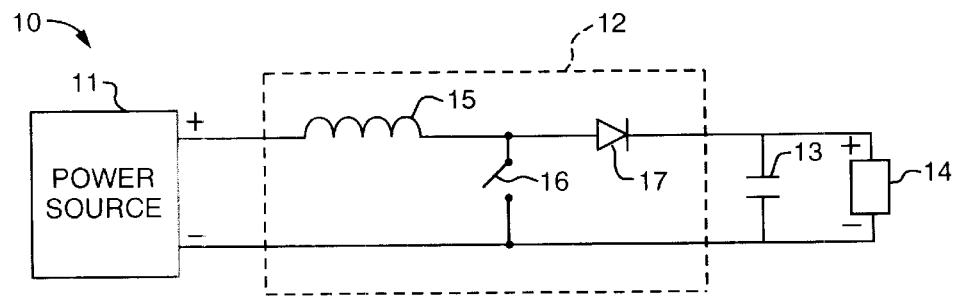
FIGS. 1A–1D are circuit diagrams of four types of switching DC-DC power converters known in the prior art.
Figure 1B:
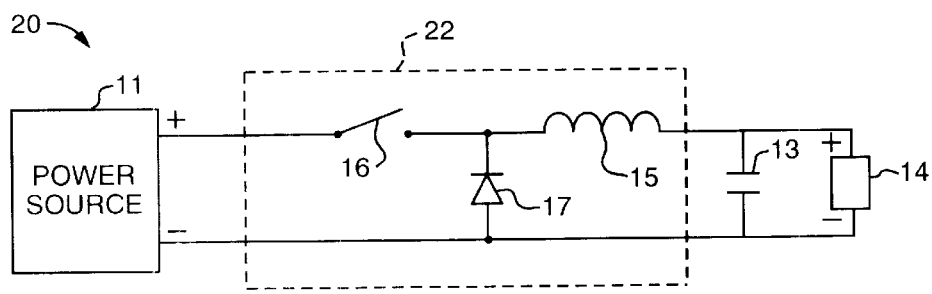
Figure 1C:
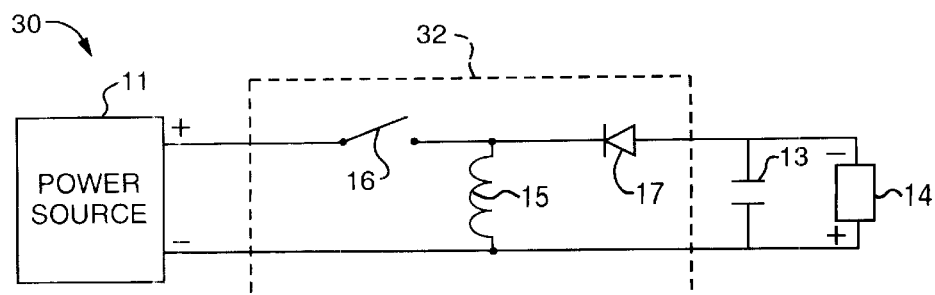
Figure 1D:
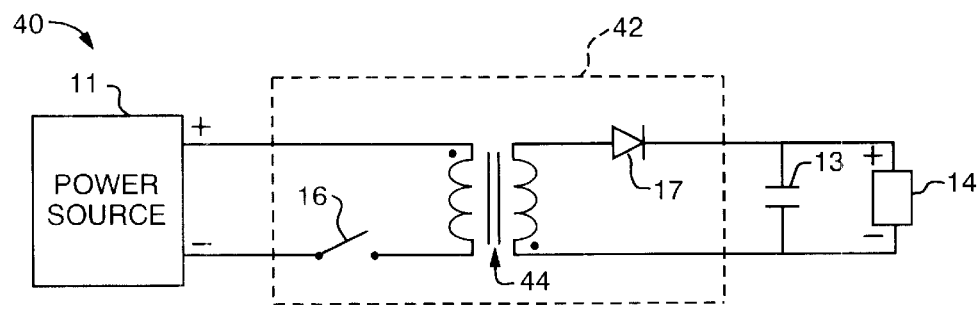

FIGS. 1A–1D show the basic circuit diagrams of four conventional switching DC-DC power converter topologies: boost (FIG. 1A); buck (FIG. 1B); inverting (FIG. 1C); and flyback (FIG. 1D). For simplicity and ease of comparison, like components may be designated by like reference numbers. A power source 11 is coupled to the input of a converter 12, 22, 32 or 42. The output of each converter is coupled to a capacitor 13 in parallel with a load 14. Each of converters 12, 22 and 32 includes an inductor 15, a switch 16 and a rectifier 17. In the case of flyback converter 42, a transformer 44 is used instead of a single inductor. Conventionally, a controller (not shown in FIGS. 1A–1D, but shown in FIG. 2) is also provided to control the duty cycle of switch 16, usually using pulse-width modulation or pulse-frequency modulation techniques which are well understood by those skilled in the art. Those skilled in the art will recognize that other configurations, including the Cuk and forward variations of these topologies are contemplated and within the scope of the invention.

Figure 2:
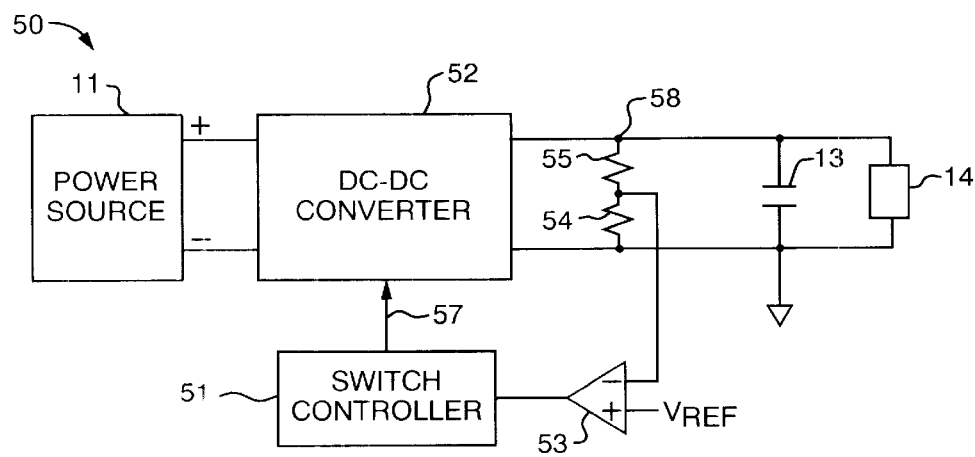
FIG. 2 is a schematic diagram of a controller for a switching DC-DC power converter known in the prior art.

FIG. 2 illustrates a conventional switching DC-DC power converter 52, which may represent any converter, including but not limited to the topologies depicted in FIGS. 1A–1D, in which the converter's output voltage is used as a feedback signal for a switch controller 51. More specifically, the converter's output voltage, as divided by resistors 54 and 55, is applied to the inverting input of an amplifier 53. A reference $V_{ref}$ voltage is applied to the non-inverting input of amplifier 53. In turn, the output (error) signal of amplifier 53 is applied to switch controller 51 which responsively adjusts the duty cycle of the switch 16 (FIGS. 1A–1D) within converter 52 such that the error becomes zero. Thus, the output voltage of converter 52 is kept essentially constant at a magnitude determined by $V_{ref}$ and resistors 54 and 55. Alternatively, the output of a current-sense amplifier (not shown) may be compared with $V_{ref}$ in order to keep the output current, as opposed to output voltage, of converter 52 essentially constant.

Figure 3:
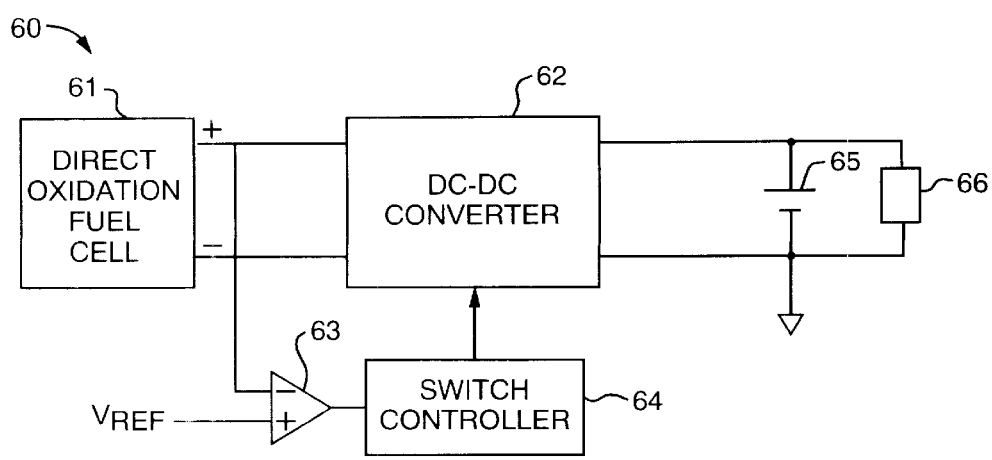
FIG. 3 is a schematic diagram of a switching DC-DC power converter and battery charger, whose power source is a direct oxidation fuel cell, constructed in accordance with a preferred embodiment of the present invention.

FIG. 3 schematically illustrates a power converter and battery charger 60 constructed in accordance with the present invention. A switching DC-DC power converter 62 is controlled by a switch controller 64. Converter 62 may, but need not, represent the converter topologies shown in FIGS. 1A–1D. The output of converter 62 is connected directly to a re-chargeable battery 65, which is in parallel with a load 66. Consequently, the output voltage of converter 62 equals the battery voltage and the output current will either charge the battery or help the battery supply current to the load. Those skilled in the art will recognize that a battery protection circuit (not shown) may be employed in order to protect the battery.

The invention may be used with any power source whose voltage output varies with current output. The invention is described herein as being implemented with a direct oxidation fuel cell, though other types of fuel cells, and other power sources whose voltage output varies with current output may be used with the invention. A direct oxidation fuel cell 61 (as used herein, the term "fuel cell" should be understood to include a fuel cell stack) serves as a power source for converter 62. Fuel cell 61 is preferably implemented as a stack of direct methanol fuel cells, but it should be understood that other types of direct oxidation fuel cells, including fuel cells which utilize ethanol or other carbonaceous fuels (or aqueous solutions thereof) are also within the scope of the invention. As fuel cell 61 is connected directly to converter 62, the output voltage of fuel cell 61 is also the input voltage to the converter.

In contrast to conventional approaches, the input voltage, as opposed to the output voltage, to converter 62 is used as a feedback signal to the switch controller loop. For illustration purposes FIG. 3 shows the fuel-cell output voltage connected to the inverting input of an amplifier 63, the reference voltage $V_{ref}$ connected to the non-inverting input of amplifier 63, and the output of amplifier 63 providing input to the switch controller 64. The switch controller loop may be implemented in many other ways, however, including methods in which the feedback signal and the reference voltage are input to a comparator rather than an amplifier. The exact method in which the controller loop is implemented is not critical to the invention. The key aspect of the invention is that the switch controller loop acts to control the input voltage of the DC-DC converter rather than the output voltage.

In a manner similar to that described previously, switch controller 64 varies the duty cycle of the switch within converter 62 such that the output voltage of fuel cell 61 is maintained at a level that is essentially equal to $V_{ref}$. Accordingly, converter 62 will draw whatever current is necessary from fuel cell 61 to keep the output voltage of the fuel cell essentially equal to $V_{ref}$. By controlling the voltage output of the fuel cell using $V_{ref}$, it is possible to optimize the efficiency of the fuel cell as operating conditions, including fuel cell temperature and fuel concentration, change. In addition, by not directly controlling the output voltage of the DC-DC converter, a direct connection between the battery and the DC-DC converter can be made which results in an efficient transfer of energy from the fuel cell to the battery.

Figure 4:
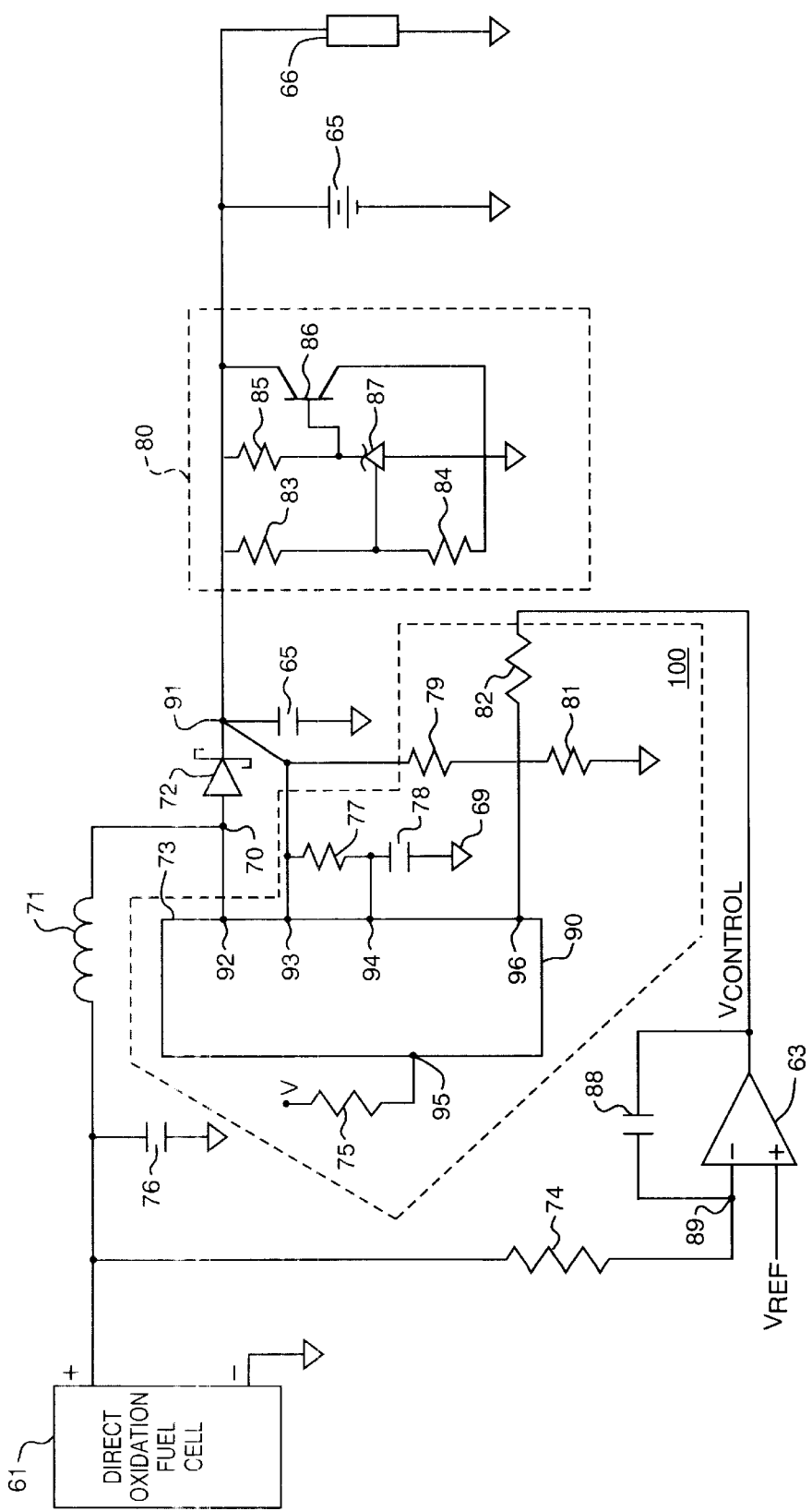
FIG. 4 is a detailed circuit diagram of one implementation of the power converter and battery charger shown in FIG. 3.

FIG. 4 is a detailed circuit diagram of a particular implementation of a power converter and battery charger 98 constructed in accordance with the present invention. A power converter 90, which in this example is an integrated circuit commercially available from MAXIM (part no. MAX 1701), with the associated components contained within dashed box 100, functions as a boost-type DC-DC power converter (topology of FIG. 1A and conventional controller topology of FIG. 2). Pin 94 is the power supply input to converter 90, which draws very little current. Feedback pin 96 of converter 90 is analogous to the inverting input pin of amplifier 53 in FIG. 2 while resistors 81 and 79 of FIG. 4 are analogous to resistors 54 and 55 of FIG. 2. In the illustrative embodiment, the $V_{ref}$ shown in FIG. 2 is internal to converter 90 and is fixed at 1.23 V. Pin 92 connects to an internal switch analogous to switch 16 in FIG. 1A. Between pins 92 and 93 of converter 90 is an internal synchronous rectifier switch that closes during the portion of the cycle that diode 72 conducts in order to increase power conversion efficiency.

Because the converter 90 is designed to control the output voltage, in order to achieve the desired fuel-cell voltage control as shown in FIG. 3 it is necessary to devise a way to control the internal switch controller of converter 90 with an external analog signal. External control is achieved in this example by injecting a control current into the feedback node at pin 96 via a control voltage, $V_{control}$, and resistor 82. Current entering the feedback node 96 through resistor 82 ($V_{control}$>1.23 V) results in a lower effective output voltage setpoint than that set by resistors 81 and 79 alone. Conversely, current leaving the feedback node 96 through resistor 82 ($V_{control}$<1.23 V) results in a higher effective output voltage setpoint than that set by resistors 81 and 79 alone. The values of resistors 79, 81 and 82 are preferably chosen to keep the magnitude of $V_{control}$ in the range 1–2 V so that the circuit will operate correctly over a range of Li-Ion battery voltages from 2.3 V to 4.2 V. The external method devised here of controlling the internal switch controller of converter 90 is possible when converter 90 is set to PWM (pulse-width modulation) mode by pulling the mode select pin 95 high. Because of the internal construction of controller 90 used in this example, external analog control of the switch controller is not feasible when controller 90 is set to PFM mode (pulse-frequency modulation, used to improve efficiency at low output currents). Although PFM mode can not be implemented in this context using the commercially-available converter 90, the present invention can be readily adapted and implemented for all switch controller methods, including PFM.

Amplifier 63 is configured to compare a reference voltage $V_{ref}$ to the output voltage of fuel cell 61. If the output voltage of fuel cell 61 starts to rise above $V_{ref}$, then the magnitude of $V_{control}$ is decreased, thereby causing the output voltage of converter 90 to increase very slightly above the battery voltage. Because of the low series resistance of the battery, the battery-protection circuit (not shown), and the connecting wires, a small rise in converter output voltage results in a large rise in output current to the battery. Increasing the amount of current delivered to the battery requires drawing more current from the fuel cell, which, in turn, causes the fuel cell's output voltage to decrease back down to $V_{ref}$. Conversely, if the fuel cell voltage decreases below $V_{ref}$, the feedback loop will cause less current to be drawn from the fuel cell allowing the fuel cell voltage to rise back up to $V_{ref}$. In this fashion, the output voltage of fuel cell 61 is essentially held equal to the reference voltage $V_{ref}$.

A shunt voltage regulator 80, connected in parallel with battery 65 and load 66, is provided to protect battery 66 from overvoltage. In one embodiment, in which the battery is a Li-Ion battery, voltage regulator 80 is set at 4.2 V such that when the battery is charged up to that voltage, current will begin to flow through regulator 80 and prevent the battery voltage increasing higher than 4.2 V. When the battery voltage is less than 4.2 V, only a small current flows through regulator 80 such that most of the available power goes to charging the battery. Although not illustrated, those skilled in the art will understand that battery monitoring circuitry can be employed, which properly terminates charging.

In accordance with an alternative embodiment of the present invention, rather than using the fuel cell's output voltage as the feedback signal, the fuel cell's output current may be used instead. In such an arrangement, a current-sense amplifier would be used to measure the output current of the fuel cell (i.e., the input current of the power converter) and the invention would operate to maintain the fuel cell's output current essentially constant while allowing the output voltage to vary.

Because of the limitations of commercially available DC-DC converter ICs, particularly the inability to have direct access to the switch controller, a custom application specific integrated circuit (ASIC) would be preferable. An ASIC which has all of the internal functionality of commercially available switching DC-DC converters, but constructed in accordance with the teachings herein, can provide good performance.

The foregoing description has been directed to specific embodiments of the invention. It will be apparent however that other variations and other modifications may be made to the described embodiments, with the attainment of some or all of the advantages of such. Therefore, it is the object of the appended claims to cover all such variations and modifications as come within the true spirit and scope of the invention.

What is claimed is:

1. A high efficiency DC-DC power converter and battery charger system comprising:
    a power source comprising a direct oxidation fuel cell means which generates an output voltage and an output current;
    a DC-DC converter circuit having an input which is connected to receive said output voltage and current from said fuel cell means;
    a re-chargeable battery connected to an output of said converter circuit; and
    a controller, coupled to said fuel cell means and said converter circuit, which compares at least one operating parameter of said fuel cell means to a reference and, in response thereto, generates control signals for said DC-DC converter circuit, whereby at least one operating parameter of said fuel cell means is maintained at a desired level, as determined by said reference.

2. The system as in claim 1 wherein said direct oxidation fuel cell means comprises one of the following:
    a direct methanol fuel cell stack wherein a fuel cell stack, comprises two or more cells that are electrically connected; and
    an individual direct methanol fuel cell.

3. The system as in claim 1 wherein a load is connected in parallel with said re-chargeable battery and said converter circuit operates to charge said battery and/or supplement current to said load.

4. The system as in claim 1 wherein said output of said converter circuit is connected to said battery such that an output voltage of said converter circuit is equal to said battery voltage.

5. A method of efficiently charging a re-chargeable battery comprising the steps of:
    (1) using a direct oxidation fuel cell means to produce power which is supplied to an input of a DC-DC converter circuit;
    (2) using an output of said converter circuit to charge a re-chargeable battery;
    (3) using at least one operating parameter of said fuel cell means as a feedback signal;
    (4) using said feedback signal to generate control signals for controlling said DC-DC power converter circuit; and
    (5) applying said control signals to said converter circuit whereby at least one operating parameter of said fuel cell means is substantially maintained at a desired level, which is determined by said reference.

6. The method of claim 5 wherein said direct oxidation fuel cell means comprises one of the following:
    a direct methanol fuel cell stack, wherein a fuel cell stack comprises two or more cells that are electrically connected; and
    an individual direct methanol fuel cell.

7. The method of claim 5 wherein a load is connected in parallel with said re-chargeable battery and said converter circuit operates to charge said battery and/or supplement current to said load.

8. The system as in claim 1 wherein said reference is adjustable.

9. The system as defined in claim 8 further comprising a control system which adjusts said reference to adjust at least one operating parameter of said fuel cell means.

10. The system as in claim 9 wherein said control system controls one or more of said fuel cell means operating parameters to substantially optimize fuel cell means power output and/or efficiency over a desired range of operating conditions.

11. The system as defined in claim 9 wherein said control system controls one or more of said fuel cell means operating parameters to perform fuel cell means diagnostics.

12. The system as defined in claim 11, wherein said fuel cell means diagnostics include measuring said fuel cell means current at at least one voltage.

13. The system as defined in claim 11, wherein said fuel cell means diagnostics include measuring said fuel cell means voltage at at least one current.

14. The system as in claim 1 wherein said direct oxidation fuel cell means comprises one of the following:
    a direct oxidation fuel cell stack wherein a fuel cell stack comprises two or more cells that are electrically connected; and
    an individual direct oxidation fuel cell.

15. The system as defined in claim 9, wherein said fuel cell means is a fuel cell stack and said control system controls one or more fuel cell stack operating parameters to substantially prevent an individual fuel cell in said fuel cell stack from operating outside of a desired voltage range.

16. The system as defined in claim 1 wherein said controller is at least one of an analog controller, a digital controller or a mixed signal controller.

17. The system as defined in claim 1 wherein said control signals are drive waveforms for switches in said DC-DC converter circuit that adjust on/off times of said switches.

18. The system as defined in claim 1 wherein said DC-DC converter circuit includes at least one of the following:

(A) inductor-based converter;

(B) transformer-based converter;

(C) step up (boost) converter;

(D) step down (buck) converter;

(E) inverting converter; and (F) capacitor-based converter.

19. The system as defined in claim 14 wherein said fuel cell means is a fuel cell stack and said fuel cell means operating parameters include: fuel cell stack output voltage, fuel cell stack output current, fuel cell stack output power, and voltages, currents and power of an individual fuel cell in the stack.

20. The system as defined in claim 14 wherein said fuel cell means is an individual fuel cell and said fuel cell means operating parameters include: fuel cell output voltage, fuel cell output current and fuel cell output power.

21. The method as defined in claim 5 wherein said reference is adjustable.

22. The method as defined in claim 21 including the further step of adjusting said reference to adjust at least one fuel cell means operating parameter.

23. The method as defined in claim 22 including the further step of adjusting at least one fuel cell means operating parameter to substantially optimize said fuel cell means power output and/or efficiency over a desired range of operating conditions.

24. The method as defined in claim 22 including the further step of adjusting at least one fuel cell means operating parameter in order to perform fuel cell means diagnostics.

25. The method as defined in claim 24 including the further step of:

measuring said fuel cell means current at at least one voltage.

26. The method as defined in claim 24 including the further step of:

measuring said fuel cell means voltage at at least one current.

27. The method of claim 5 wherein said direct oxidation fuel cell means comprises one of the following:

a direct oxidation fuel cell stack, wherein a fuel cell stack comprises two or more cells that are electrically connected; and an individual direct oxidation fuel cell.

28. The method as defined in claim 27 wherein said fuel cell means is a fuel cell stack, the method including the further step of:

adjusting at least one fuel cell stack operating parameter to substantially prevent an individual cell in said fuel cell stack from operating outside of a desired voltage range.

29. The method as defined in claim 5 wherein said DC-DC converter circuit includes at least one of the following:

(A) inductor-based converter;

(B) transformer-based converter;

(C) step up (boost) converter;

(D) step down (buck) converter;

(E) inverting converter; and (F) capacitor-based converter.

30. The method as defined in claim 5 including the further step of using said control signals as drive waveforms for switches in said DC-DC converter circuit to adjust on/off times of said switches.

31. The method as defined in claim 27 wherein said fuel cell means is a fuel cell stack and said fuel cell means operating parameters include: fuel cell stack output voltage, fuel cell stack output current, fuel cell stack output power, and voltages, currents and power of an individual fuel cell in the stack.

32. The method as defined in claim 27 wherein said fuel cell means is an individual fuel cell and said fuel cell means operating parameters include: fuel cell output voltage, fuel cell output current and fuel cell output power.

33. The method as defined in claim 5 including the further step of:

using a controller to generate said control signals; and selecting as said controller, at least one of an analog controller, a digital controller or a mixed signal controller.

34. The system as defined in claim 1 wherein said power source comprises a plurality of direct oxidation fuel cells means.

35. The system as defined in claim 34 wherein each fuel cell means in said plurality of fuel cells means of said power source is coupled to its own DC-DC converter circuit having a controller associated therewith, and an output of each said associated DC-DC converter circuit is coupled to a single rechargeable battery.

* * * * *